(12) United States Patent
Tran et al.

(10) Patent No.: US 11,677,664 B2
(45) Date of Patent: *Jun. 13, 2023

(54) APPARATUS AND METHOD OF GENERATING LOOKUPS AND MAKING DECISIONS FOR PACKET MODIFYING AND FORWARDING IN A SOFTWARE-DEFINED NETWORK ENGINE

(71) Applicant: Marvell Asia Pte., Ltd., Singapore (SG)

(72) Inventors: Anh T. Tran, Santa Clara, CA (US); Gerald Schmidt, San Jose, CA (US); Tsahi Daniel, Palo Alto, CA (US); Harish Krishnamoorthy, San Jose, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 324 days.

This patent is subject to a terminal disclaimer.

(21) Appl. No.: 16/922,895

(22) Filed: Jul. 7, 2020

(65) Prior Publication Data

US 2020/0336423 A1 Oct. 22, 2020

Related U.S. Application Data

(60) Continuation of application No. 15/991,810, filed on May 29, 2018, now Pat. No. 10,749,800, which is a
(Continued)

(51) Int. Cl.
*G06F 7/00* (2006.01)
*H04L 45/745* (2022.01)
(Continued)

(52) U.S. Cl.
CPC ............ *H04L 45/745* (2013.01); *G06F 16/00* (2019.01); *G06F 16/2228* (2019.01);
(Continued)

(58) Field of Classification Search
CPC ........ G16H 70/20; G16H 20/30; G16H 50/30; G16H 50/70; G16H 40/63; G06F 16/285;
(Continued)

(56) References Cited

U.S. PATENT DOCUMENTS 4,929,939 A 5/1990 Varma
5,319,347 A 6/1994 McClure
(Continued)

FOREIGN PATENT DOCUMENTS

CN 1675635 A 9/2005
CN 1798102 A 7/2006
(Continued)

OTHER PUBLICATIONS

The Korean Office Action dated Oct. 16, 2020 for the Korean Patent Application No. 10-2014-0192064.
(Continued)

*Primary Examiner* — Isaac M Woo

(57) ABSTRACT

Embodiments of the present invention relate to a Lookup and Decision Engine (LDE) for generating lookup keys for input tokens and modifying the input tokens based on contents of lookup results. The input tokens are parsed from network packet headers by a Parser, and the tokens are then modified by the LDE. The modified tokens guide how corresponding network packets will be modified or forwarded by other components in a software-defined networking (SDN) system. The design of the LDE is highly flexible and protocol independent. Conditions and rules for generating lookup keys and for modifying tokens are fully programmable such that the LDE can perform a wide variety of reconfigurable network features and protocols in the SDN system.

6 Claims, 6 Drawing Sheets

Related U.S. Application Data division of application No. 15/167,704, filed on May 27, 2016, now Pat. No. 10,009,273, which is a continuation of application No. 14/144,270, filed on Dec. 30, 2013, now Pat. No. 9,379,963.

(51) Int. Cl.
*G06F 16/00* (2019.01)
*G06F 16/22* (2019.01)
*G06F 16/9535* (2019.01)
*H04L 45/74* (2022.01)
*H04L 45/00* (2022.01)

(52) U.S. Cl.
CPC ...... *G06F 16/2282* (2019.01); *G06F 16/9535* (2019.01); *H04L 45/00* (2013.01); *H04L 45/74* (2013.01)

(58) Field of Classification Search
CPC .............. G06F 16/955; G06F 16/2282; G06F 16/24575; G06F 16/9535; G06F 16/24578; G06F 16/951; G06F 16/00; G06F 16/2228; G16B 20/20; G16B 20/00; G16B 20/40; G06N 3/08; G06N 5/04; G06N 7/005; G06Q 40/08; H04L 45/745; H04L 45/00; H04L 45/74
USPC .................................................. 707/600–899
See application file for complete search history.

(56) References Cited

U.S. PATENT DOCUMENTS

| | | | |
|---|---|---|---|
| 6,667,984 B1 | 12/2003 | Chao et al. | |
| 6,831,917 B1 | 12/2004 | Cheriton | |
| 7,461,167 B1 | 12/2008 | Park | |
| 8,054,744 B1 | 11/2011 | Bishara et al. | |
| 9,159,420 B1 | 10/2015 | Wohlgemuth | |
| 9,331,939 B2 | 5/2016 | Thomas et al. | |
| 9,379,963 B2 | 6/2016 | Tran | |
| 9,590,914 B2 | 3/2017 | Alizadeh Attar et al. | |
| 9,620,213 B2 | 4/2017 | Tran et al. | |
| 2002/0009076 A1 | 1/2002 | Engbersen | |
| 2002/0099900 A1 | 7/2002 | Kawarai et al. | |
| 2003/0093613 A1 | 5/2003 | Sherman | |
| 2003/0231634 A1* | 12/2003 | Henderson | H04L 49/254 370/465 |
| 2005/0076228 A1 | 4/2005 | Davis | |
| 2005/0193240 A1 | 9/2005 | Ash | |
| 2006/0045074 A1 | 3/2006 | Lee | |
| 2006/0059269 A1 | 3/2006 | Chen et al. | |
| 2007/0160052 A1 | 7/2007 | Okada | |
| 2008/0141023 A1 | 6/2008 | Qi | |
| 2009/0028045 A1 | 1/2009 | Stellenberg et al. | |
| 2011/0026405 A1 | 2/2011 | Takagi et al. | |
| 2011/0307656 A1 | 12/2011 | Hamdi et al. | |
| 2013/0034100 A1 | 2/2013 | Goyal et al. | |
| 2013/0163475 A1 | 3/2013 | Beliveau et al. | |
| 2013/0294458 A1 | 11/2013 | Yamaguchi et al. | |
| 2014/0153443 A1 | 5/2014 | Carter | |
| 2014/0241353 A1 | 8/2014 | Zhang | |
| 2014/0369363 A1 | 12/2014 | Hutchison | |
| 2015/0156288 A1 | 6/2015 | Lu | |
| 2015/0172189 A1 | 6/2015 | Pitchai | |
| 2015/0187419 A1 | 7/2015 | Tran | |
| 2016/0028623 A1 | 1/2016 | Kamath | |
| 2016/0197852 A1 | 7/2016 | Hutchinson et al. | |

FOREIGN PATENT DOCUMENTS

| | | |
|---|---|---|
| CN | 103347013 A | 10/2013 |
| CN | 103959302 A | 7/2014 |
| CN | 104010049 A | 8/2014 |
| CN | 104012063 A | 8/2014 |
| CN | 103856405 A | 6/2016 |
| EP | 1553738 A1 | 7/2005 |
| JP | 2001024641 A | 1/2001 |
| JP | 2002077269 A | 3/2002 |
| JP | 2002198430 A | 7/2002 |
| JP | 2002208938 A | 7/2002 |
| JP | 2007208963 A | 8/2007 |
| JP | 2010233018 A | 10/2010 |
| TW | 200832408 A | 8/2008 |
| TW | 201134252 A | 10/2011 |
| WO | 2009133918 A | 11/2009 |
| WO | 2013093857 A1 | 6/2013 |
| WO | 2013119241 A1 | 8/2013 |

OTHER PUBLICATIONS

The Korean Office Action dated Dec. 4, 2020 for the Korean Patent Application No. 10-2014-0194209.
The Office Action dated Jan. 4, 2022 for the Korean Patent Application No. 10-2021-0135712.
The Office Action dated Jan. 27, 2022 for the Korean Patent Application No. 10-2021-0142837.
The office action from the Chinese Application No. 2014108380634 dated Nov. 21, 2018.
The office action from the Chinese Application No. 2014108384334 dated Dec. 12, 2018.
The office action from the Chinese Application No. 2014108439341 dated May 21, 2019.
The office action from the Chinese Application No. 2016800150839 dated Mar. 18, 2020.
The office action from the Japanese Application No. 2014-267001, dated Nov. 19, 2018.
The office action from the Japanese Application No. 2014-263371, dated Nov. 12, 2018.
The office action from the Japanese Application No. 2014-267000, dated Nov. 19, 2018.
The office action from the Japanese Application No. 2014-263372, dated Dec. 3, 2018.
The office action from the Taiwanese Application No. 103145450, dated Sep. 17, 2018.
The office action from the Taiwanese Application No. 103145445, dated Nov. 19, 2018.
The office action from the Taiwanese Application No. 103145662, dated Sep. 17, 2018.
Altera, "White Paper" Jul. 2006, pp. 1-9.
Bosshart, Pat, "Forwarding Metamorphis: Fast Programmable Match-Action Processing in Hardware for SDN", Aug. 12, 2013, ACM, pp. 99-109.
Glen Gibb, "Reconfigurable Hardware for Software-Defined Networks", Nov. 2013, Stanford University.
Price, Charles, MIPS IV Instruction Set, Sep. 1995, MIPS, pp. A-28-A-29 & A-105-A-106.
The office action from the Chinese Application No. 2014108439341 dated Dec. 24, 2018.
The office action from the Taiwanese Application No. 103145662 dated Nov. 16, 2018.
The Decision to Grant dated Jul. 14, 2021, for the Korean Patent Application No. 10-2014-0194209.
The Office Action dated Aug. 19, 2021 for the Korean Patent Application No. 10-2014-0191978.
The Notice of Allowance dated Aug. 28, 2020 for the Chinese Patent Application No. 20168001150839.

\* cited by examiner

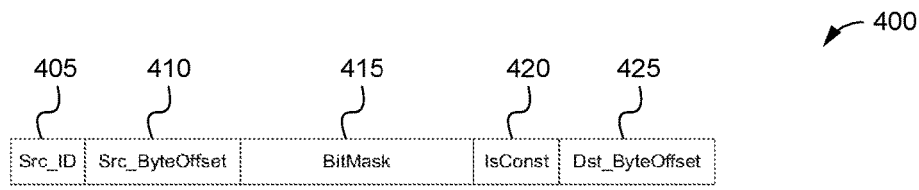
Fig. 4A
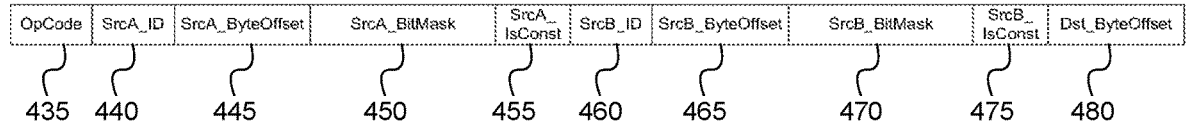
Fig. 4B
| Src_ID | Notes |
|---|---|
| 0 | copy from Layer0 of the input token |
| 1 | copy from Layer1 of the input token |
| ... | ... |
| $N-1$ | copy from Layer<$N$-1> of the input token |
| $N$ | copy from Common portion of the input token |
| $N+1$ | copy from Template Metadata |
Fig. 4C

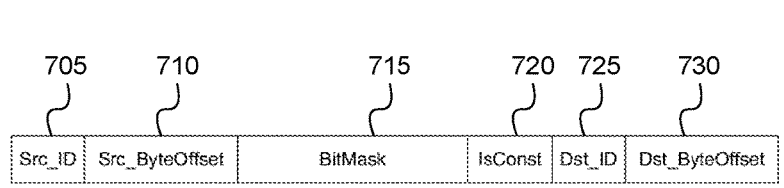

Fig. 7A

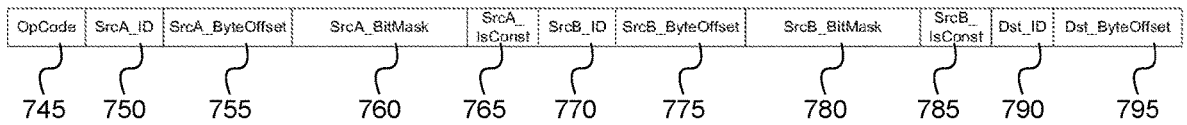

Fig. 7B

| Src_ID | Notes |
|---|---|
| 0 | copy from Layer0 of the input token |
| 1 | copy from Layer1 of the input token |
| ... | ... |
| N-1 | copy from Layer<N-1> of the input token |
| N | copy from Common portion of the input token |
| N+1 | copy from Template Metadata |
| N+2 | copy from Search/Policer lookup result |

Fig. 7C

| Dst_ID | Notes |
|---|---|
| 0 | copy to Layer0 of the output token |
| 1 | copy to Layer1 of the output token |
| ... | ... |
| N-1 | copy to Layer<N-1> of the output token |
| N | copy to Common portion of the output token |

Fig. 7D

APPARATUS AND METHOD OF GENERATING LOOKUPS AND MAKING DECISIONS FOR PACKET MODIFYING AND FORWARDING IN A SOFTWARE-DEFINED NETWORK ENGINE

RELATED APPLICATIONS

This Application is a continuation of co-pending U.S. application Ser. No. 15/991,810, filed on May 29, 2018, and entitled "APPARATUS AND METHOD OF GENERATING LOOKUPS AND MAKING DECISIONS FOR PACKET MODIFYING AND FORWARDING IN A SOFTWARE-DEFINED NETWORK ENGINE" which is a divisional of U.S. application Ser. No. 15/167,704, filed on May 27, 2016, and entitled "APPARATUS AND METHOD OF GENERATING LOOKUPS AND MAKING DECISIONS FOR PACKET MODIFYING AND FORWARDING IN A SOFTWARE-DEFINED NETWORK ENGINE" which is a continuation of U.S. application Ser. No. 14/144,270, filed on Dec. 30, 2013, and entitled "APPARATUS AND METHOD OF GENERATING LOOKUPS AND MAKING DECISIONS FOR PACKET MODIFYING AND FORWARDING IN A SOFTWARE-DEFINED NETWORK ENGINE" which are all also hereby incorporated by reference.

FIELD OF INVENTION

The present invention relates to engine architectures for generating lookup keys and modifying network packets. More particularly, the present invention relates to apparatus and method of generating lookups and making decisions for packet modifying and forwarding in a software-defined network engine.

BACKGROUND OF THE INVENTION

Traditionally, networking features and protocols in network devices have been implemented by hardware-dedicated ASIC designs. These fixed ASIC designs limit the rate of deployment of new protocols. Hardware changes to support new protocols are expensive in term of both cost and time. As a result, programmable networking devices which allow users to deploy new features and protocols by means of software are becoming more attractive.

An approach of the prior art for implementing new network protocols is to use software running on state-of-the-art general-purpose CPUs. However, the processing capacity of these general-purpose CPUs, currently at maximum of 64 bits, cannot guarantee real-time performance for current networking systems that support network packet flows up to 100 Gbps.

Another approach of the prior art for implementing new network protocols is to use reconfigurable FPGA chips. However, limitations in logic cell capacity of FPGA chips do not allow processing network packets with large sizes, such as hundreds of bytes, at full throughput. In addition, high complexity in internal interconnect wirings makes FPGA chips run at low frequency with high latency. These poor characteristics of FPGA chips are not appropriate for performing complex network features required in state-of-the-art enterprise and data-center networks.

BRIEF SUMMARY OF THE INVENTION

In a software-defined networking (SDN) system, the proposed Lookup and Decision Engine (LDE) is able to generate lookup keys for input tokens and to modify the input tokens based on lookup results such that the corresponding network packets can be correctly processed and forwarded by other components in the system. The conditions and rules for generating keys and modifying tokens are fully programmable by software and are based on network features and protocols configured for the LDE. The LDE typically includes two main blocks: a Key Generator and an Output Generator. As named, the Key Generator generates a lookup key for each input token, and the Output Generator generates an output token, which is a modified version of the input token based on the lookup result. The Key Generator and the Output Generator have a similar design architecture, which includes a Control Path and a Data Path. The Control Path examines whether specific fields and bits in its input satisfy conditions of the configured protocols. Based on the examination outcomes, it generates instructions accordingly. The Data Path executes all instructions produced by the Control Path for generating the lookup key in the Key Generator or for generating the output token in the Output Generator. The conditions and rules for key and output generations are fully programmable in the Control Paths of the Key Generator and the Output Generator.

In one aspect, an engine for generating lookups and making decisions for packet modifying and forwarding in a software-defined network (SDN) system is provided. The provided engine is named Lookup and Decision Engine (LDE) for simplicity. The LDE typically includes a Key Generator configured to generate a lookup key for each input token, and an Output Generator configured to generate an output token by modifying the input token based on content of a lookup result associated with the lookup key.

In some embodiments, the LDE further includes an Input Buffer, which can be a FIFO buffer, for temporarily storing the input token before the input token is processed by the LDE, a Template Table for identifying positions of fields in the input token, a Lookup Result Collector for joining the input token with the lookup result and for sending the joined input token with the lookup result to the Output Generator, a Loopback Checker for determining whether the output token should be sent back to the LDE or to another engine in a SDN system, and a Loopback Buffer, which can be a FIFO buffer, for storing the loopback token.

In some embodiments, a template lookup pointer to the Template Table is a value of a "TemplateID" field inside the input token. In some embodiments, a template lookup result of the Template Table contains information of a number of token layers, offsets of the token layers in the input token, and metadata bits which are additional control bits not available inside the input token.

In some embodiments, the Lookup Result Collector includes a Token Buffer and a Lookup Result Buffer. The depth of each of the Token Buffer and the Lookup Result Buffer is at least equal to the latency of a remote Search Engine (which is responsible for returning a lookup result for each lookup key generated by the LDE) to guarantee the LDE to operate at full throughput.

In some embodiments, the determination by the Loopback Checker is based on a comparison of a "DstEngineAddress" field in the output token and the address of the LDE.

In some embodiments, tokens inside the Loopback Buffer have higher priority than those in the Input Buffer to avoid deadlock.

In some embodiments, the Key Generator includes a Control Path for generating instructions and a Data Path for executing instructions produced by the Control Path.

The Control Path includes a Control Bits Extractor for extracting control bits from the input token and metadata bits from a corresponding template information, a MUX/CMP Cone for comparing multi-bit words in the input token and corresponding template metadata, a MUX/LUT Logic Cone for checking whether the control bits and outputs of MUX/CMP cone satisfy conditions and rules of specific network features and protocols configured for the LDE, and a plurality of Instruction Tables for generating the instructions based on outputs of the MUX/LUT Logic Cone.

In some embodiments, the Control Bits Extractor is reconfigurable by software to allow users to select which bits among the control bits and the metadata bits to be extracted.

In some embodiments, the MUX/CMP Cone includes a plurality of MUX/CMP Cells in parallel, wherein each of the MUX/CMP Cells includes two reconfigurable multiplexors for selecting two words from the input token and the corresponding template metadata, and a reconfigurable comparator configured to support at least three operations including matching/equal to (==), greater than (>), and less than (<). Each of the MUX/CMP Cells can be configured to compare a word from the input token and the corresponding template metadata with a constant value.

In some embodiments, the MUX/LUT Logic Cone includes a plurality of stages, wherein each of the stages includes a plurality of MUX/LUT Cells in parallel. Each of the MUX/LUT Cells includes six reconfigurable multiplexors for selecting six bits from input bits of that MUX/LUT Cell and a reconfigurable lookup table (LUT) containing 64 bits which is indexed by six output bits of the six reconfigurable multiplexors.

A number of instructions returned by the Control Path is able to generate the lookup key. In some embodiments, two kinds of instructions are produced by the Control Path: Copy instructions and ALU instructions. The Copy instruction can be configured to copy data from a source or to copy a constant value to a position in the output key, wherein the source is one of the input token and the corresponding template metadata. The ALU instruction can be configured to copy an ALU result of two operands to a position in an output key, wherein the two operands are taken from input sources, and wherein the input sources is one of the input token and the corresponding template metadata. The ALU instruction can also be configured to copy an ALU result of a constant value and an operand to a position in an output key, wherein the operand is taken from an input source to a position in the output key, and wherein the source is one of the input token and the corresponding template metadata. An ALU operation for the ALU instruction is one of addition (+), subtraction (−), bitwise AND (&), bitwise OR (|), bitwise XOR (^), bitwise shift left (<<), and bitwise shift right (>>).

The Data Path includes a Delay Matching Queue for buffering the input token while waiting for the Control Path to generate the instructions and an Instructions Execution block to execute, in parallel, all of the instructions produced by the Control Path for generating the lookup key.

In some embodiments, the Delay Matching Queue is a FIFO buffer or shift register with depth equal to the latency of the Control Path such that the Key Generator can operate in full throughput.

In some embodiments, the lookup key is initialized by all zeros before all instructions are executed.

In some embodiments, the Output Generator has similar design as the Key Generator but has input data and output data that are different from those of the Key Generator. The input data of the Output Generator includes the input token, the metadata bits from the corresponding template information and the lookup result. The output data of the Output Generator is a modified version of the input token.

In some embodiments, the Output Generator includes a MUX/CMP Cone with more MUX/CMP Cells than a MUX/CMP Cone in the Key Generator, and the Output Generator includes a MUX/LUT Logic Cone with more stages than a MUX/LUT Logic Cone in the Key Generator.

In some embodiments, the output token is initialized to have the same content as the input token before all instructions are executed.

In some embodiments, the Control Paths of both the Key Generator and the Output Generator are programmable such that users are able to configure the LDE to support different network features and protocols. Content of the output token is used by other components in a SDN system to appropriately modify and forward its corresponding network packet.

In another aspect, a method of generating lookups and making decisions for packet modifying and forwarding in a software-defined network (SDN) engine is provided. The method includes buffering input tokens at an Input Buffer, retrieving metadata bits for each of the input tokens, wherein the metadata bits are not available inside the input tokens, generating a lookup key for each of the input tokens based on at least specific bits of each of the input tokens and the metadata bits, receiving a lookup result based on the lookup key, modifying one or more fields in the input token based on the lookup result and content of the input token, determining whether the modified token is to be sent back to the current engine or to another engine in a SDN system, and based on the determination, buffering the modified token in a Loopback Buffer, wherein tokens in the Loopback Buffer have higher priority than tokens in the Input Buffer.

In some embodiments, the Input Buffer and the Loopback Buffer are FIFO buffers.

In some embodiments, a data format of a token includes a Common Portion and a Layers Portion. The Common Portion includes general control bits of a corresponding network packet and a value of a lookup pointer to a Template Table. The value of the lookup pointer is given by the "TemplateID" field in the token. In some embodiments, the method further includes retrieving from the Template Table the number and offsets of token layers in the Layers Portion of the token.

The Layers Portion includes information of all parsed packet headers of a corresponding network packet. Each of the parsed packet headers is associated with a "Control" field and a "Data" field in the Layers portion.

In yet another aspect, a software-defined network (SDN) system is provided. The system includes a Parser, at least one Lookup and Decision Engine, a Search Engine, an Update Read Write block and a Packet Memory and Transmitting Queue block. The Parser is configured to receive incoming network packets, to parse headers of these incoming network packets and to output tokens. The at least one Lookup and Decision Engine is configured to generate lookup keys for these tokens, and then modify these tokens based on the received lookup results. The Search Engine is configured to return a lookup result for each lookup key sent by each LDE. The Update Read Write (URW) block is configured to modify the packet headers of each of the network packets based on the modified tokens. The Packet Memory and Transmitting Queue block is configured to combine the modified packet headers and the original payload of the corresponding packet for output.

In some embodiments, the at least one Lookup and Decision Engines includes a plurality of Lookup and Decision Engines coupled in serial for performing multiple lookups sequentially or in parallel for performing multiple lookups simultaneously. In some embodiments, each of the at least one Lookup and Decision Engine includes a Key Generator and an Output Generator. The Key Generator is configured to generate a lookup key for each input token. The Output Generator is configured to modify the input token based on content of a lookup result associated with the lookup key.

BRIEF DESCRIPTION OF THE DRAWINGS

FIG. 4A illustrates a format of a Copy instruction for key generation according to an embodiment of the present invention.

FIG. 4B illustrates a format of an ALU instruction for key generation according to an embodiment of the present invention.

FIG. 4C illustrates a table listing of sources of key generation instructions according to an embodiment of the present invention.

FIG. 7A illustrates a format of a Copy instruction for output generation according to an embodiment of the present invention.

FIG. 7B illustrates a format of an ALU instruction for output generation according to an embodiment of the present invention.

FIG. 7C illustrates a table listing of sources of output generation instructions according to an embodiment of the present invention.

FIG. 7D illustrates a table listing of destinations of output generation instructions according to an embodiment of the present invention.

Figure 1:
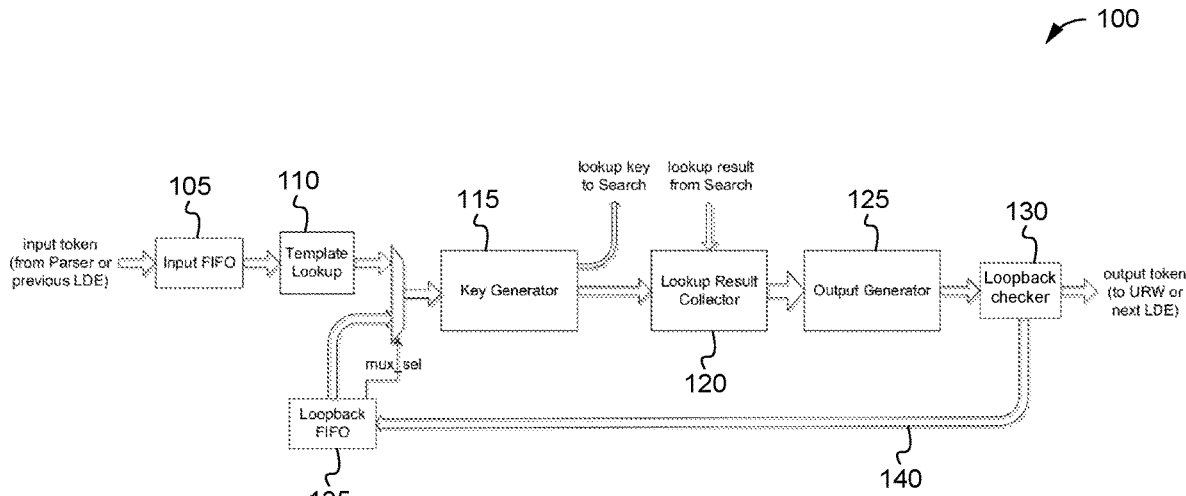
FIG. 1 illustrates a block diagram of a software-defined network (SDN) engine for generating lookup keys and modifying tokens according to an embodiment of the present invention.

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

In the following description, numerous details are set forth for purposes of explanation. However, one of ordinary skill in the art will realize that the invention can be practiced without the use of these specific details. Thus, the present invention is not intended to be limited to the embodiments shown but is to be accorded the widest scope consistent with the principles and features described herein.

In a software-defined networking (SDN) system, the proposed Lookup and Decision Engine (LDE) is able to generate lookup keys for input tokens and to modify the input tokens based on lookup results such that the corresponding network packets can be correctly processed and forwarded by other components in the system. The conditions and rules for generating keys and modifying tokens are fully programmable by software and are based on network features and protocols configured for the LDE. The LDE typically includes two main blocks: a Key Generator and an Output Generator. As named, the Key Generator generates a lookup key for each input token, and the Output Generator generates an output token, which is a modified version of the input token based on the lookup result. The Key Generator and the Output Generator have a similar design architecture, which includes a Control Path and a Data Path. The Control Path examines whether specific fields and bits in its input satisfy conditions of the configured protocols. Based on the examination outcomes, it generates instructions accordingly. The Data Path executes all instructions produced by the Control Path for generating the lookup key in the Key Generator or for generating the output token in the Output Generator. The conditions and rules for key and output generations are fully programmable in the Control Paths of the Key Generator and the Output Generator. The LDE also includes an Input FIFO for temporarily storing the input tokens, a Lookup Result Collector for collecting the lookup results for the lookup keys, a Loopback Check for sending an output token back to the LDE in the case where multiple serial lookups is required for that token at the same LDE, and a Loopback FIFO for storing loopback tokens. The loopback path typically has higher priority than an input path to guarantee deadlock freedom.

The Key Generator and the Output Generator are similarly configured as an SDN processing engine discussed in U.S. patent application Ser. No. 14/144,260, entitled "Method and Apparatus for Parallel and Conditional Data Manipulation in a Software-Defined Network Processing Engine," and filed Dec. 30, 2013, which is hereby incorporated by reference.

FIG. 1 illustrates a block diagram of a software-defined network (SDN) engine 100 for generating lookup keys and modifying tokens according to an embodiment of the present invention. The SDN engine 100 of the present invention is called a Lookup and Decision Engine (LDE). The LDE 100 generates lookup keys and modifies input tokens based on lookup results and content of the input tokens. Conditions and rules for generating lookup keys and modifying the input tokens are typically programmable by users.

The LDE 100 can receive the input tokens from a Parser. The Parser typically parses headers of each network packet and outputs an input token for each network packet. An input token typically has a predefined format such that the LDE 100 will be able to process the input token. The format of the input token is discussed in detail below in FIG. 2A. The LDE 100 can also receive the input tokens from a previous LDE if multiple LDEs are coupled in a chain for performing, in serial, multiple lookup and token modification steps.

The input tokens received at the LDE 100 from an upstream Parser or an upstream LDE are first buffered inside an Input FIFO 105. The input tokens wait inside the Input FIFO 105 until the LDE is ready to process them. If the Input FIFO 105 is full, the LDE 100 notifies the source of the input tokens (i.e., an upstream Parser or an upstream LDE) to stop sending new tokens.

Positions of fields in each input token are identified by looking up from a table, namely Template Lookup block 110. The input tokens are next sent to a Key Generator 115. The Key Generator 115 is configured to pick up specific data in the input tokens for building the lookup keys. Configuration of the Key Generator 115 is typically user-defined and depends on network features and protocols users want the LDE 100 to perform.

A lookup key per each input token is output from the Key Generator 115 and is sent to a remote Search Engine (not illustrated). The remote Search Engine can perform multiple configurable lookup operations such as TCAM, direct-access, hash-based and longest prefix matching lookup. For each lookup key sent to the remote Search Engine, a lookup result is returned to the LDE 100 at a Lookup Result Collector 120.

While generating a lookup key for each input token, the Key Generator 115 also passes the input token to the Lookup Result Collector 120. The input token is buffered inside the Lookup Result Collector 120. The input token waits inside the Lookup Result Collector 120 until the lookup result is returned by the remote Search Engine. Once the lookup result is available, the input token along with the lookup result are sent to an Output Generator 125.

Based on the lookup result and content of the input token, the Output Generator 125 modifies one or several fields of the input token before sending the modified token to output. Similar to the Key Generator 1125, configuration of the Output Generator 125 regarding, for example, conditions and rules for token modification, is typically user-defined and depends on network features and protocols users want the LDE 100 to perform.

After the token is modified, the modified token is sent to a Loopback Checker 130. The Loopback Checker 130 determines whether the modified token should be either sent back to the current LDE for doing another lookup or sent to another engine in the associated SDN system. This loopback check is a design option that advantageously allows a single LDE to perform multiple lookups in serial for the same token rather than using multiple engines to do the same. This design option is useful in a system with a limited number of LDEs due to limitations, such as chip area budget. Tokens sent back to the current LDE are buffered inside a Loopback FIFO 135 via a loopback path 140. The loopback path 140 always has higher priority than the input path (e.g., from the Input FIFO 105) to avoid deadlock. Although FIG. 1 has been described as using FIFO buffers, other buffer types are possible.

Figure 2A:
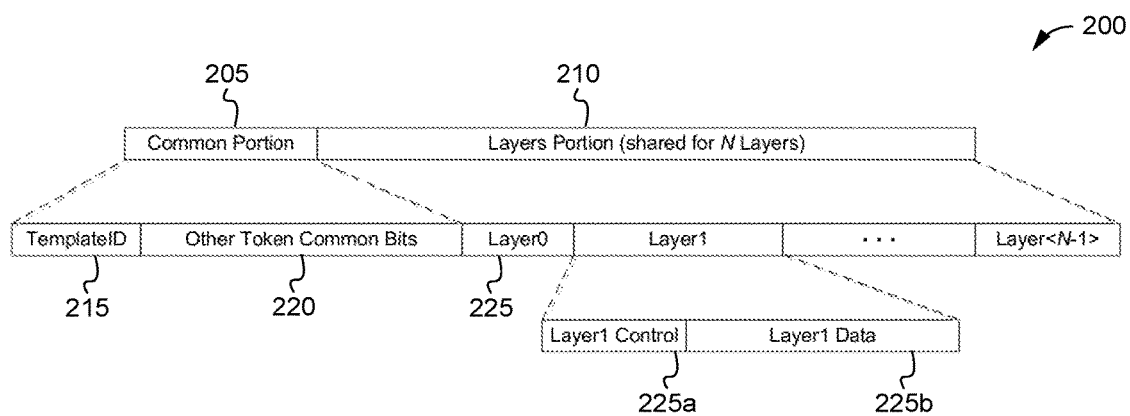
FIG. 2A illustrates a format of a token according to an embodiment of the present invention.

For the LDE 100 to understand the content of each token, the tokens have a common format that is understood by all engines in the SDN system. FIG. 2A illustrates a format of a token 200 according to an embodiment of the present invention. The token 200 includes two main portions: a Common Portion 205 and a Layers Portion 210.

The Common Portion 205 contains general control bits 220 of the corresponding network packet, which were put into the token by the Parser. The control bits include those for, but not limited to, timestamp, sequence number, priority, next engine address in the SDN system on-chip, source port, network packet byte count, etc. These general control fields 220 are chosen by users, such as SDN system designers, and are typically useful for engines in the SDN system to properly manipulate network packets.

The Layers Portion 210 of the token contains all parsed headers of the corresponding network packet. In a network, each network packet often encapsulates many headers, such as Ethernet, MPLS, IP, TCP, HTTP, VLAN, and so on. It is common for a network packet to have eight or more different headers during the time the network packet travels on the network. For engines in the SDN system to correctly process the network packet, all network packet headers are parsed by the Parser in the SDN system. In particular, the Parser parses these network packet headers and puts the parsed information of packet headers in the Layers Portion 210 of the token. Each parsed network packet header has a corresponding Layer 205 inside the Layers Portion 210 of the token.

Each Layer 225 in the token includes two fields: a "Control" field 225a, and a "Data" field 225b. The "Control" field 225a contains main control bits of the corresponding parsed packet header such as priority and protocol type, which are embedded into the Layer 205 by the Parser such that engines in the SDN system can properly manipulate the network packet headers in the Layers Portion 210. The "Data" field 225b contains the rest of the information of the corresponding parsed network packet header.

Since each network packet can have multiple headers with different sizes, the Layers Portion 210 inside each token also contains multiple layers with different sizes. To identify the number of Layers 225 and their sizes as well as their positions inside the token, a "TemplateID" field 215 inside the Common Portion 205 of the token is used by an engine, such as the LDE 100 of FIG. 1. The "TemplateID" field 215 is previously embedded in the Common Portion 205 by the Parser while parsing the corresponding network packet. The LDE 100 uses the value of the "TemplateID" field 215 as a lookup pointer to a Template Table 250 of FIG. 2B which is the Template Lookup 110 of FIG. 1.

Figure 2B:
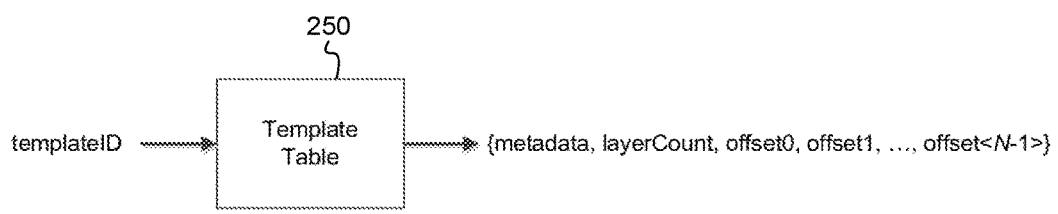
FIG. 2B illustrates a block diagram of a Template Table according to an embodiment of the present invention.

The Template Table 250 receives the value of the "TemplateID" field 215 and returns the number of layers packed into the Layers Portion 210 and offsets of these layers in the token as illustrated in FIG. 2B. Since the offsets provide positions of the Layers 225 inside the token, it should be appreciated that the order of the Layers 225 do not necessarily need to correspond with the order of the headers of the respective network packet.

In addition, the Template Table 250 also returns metadata bits for each input token which are additional control bits for that input token. Using the Template Table 250 advantageously reduces the size of each token and, therefore, hardware costs, because information such as the metadata bits and the offsets of layers can be put into the Template Table 250 rather than being carried by the token itself. Configuration of the Template Table 250 is typically user-defined and depends on network features and network packet headers the Parser and engines in the SDN system support.

Figure 3:
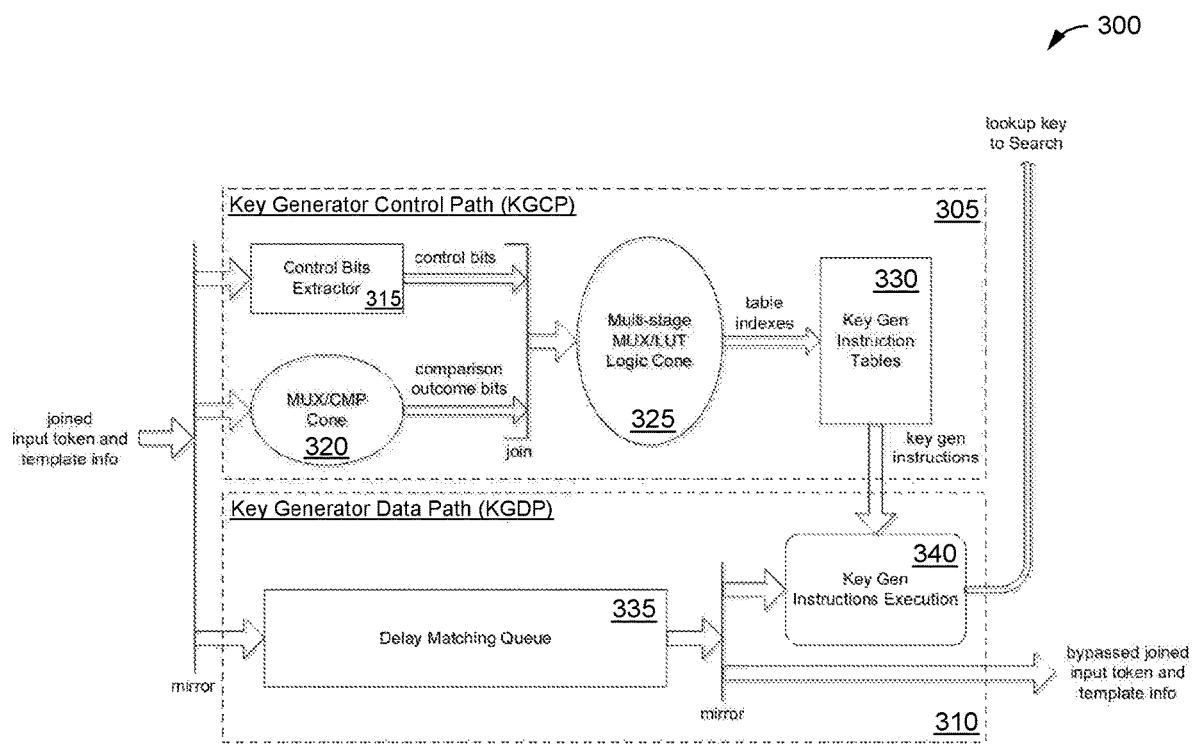
FIG. 3 illustrates a block diagram of a Key Generator according to an embodiment of the present invention.

Each input token and its corresponding template information, which is returned by the Template Table 250, are joined and sent to the Key Generator 115 from the Template Lookup 110 of FIG. 1 for generating a lookup key. FIG. 3 illustrates a block diagram of a Key Generator 300 according to an embodiment of the present invention. In some embodiments, the Key Generator 115 of FIG. 1 is similarly configured as the Key Generator 300. At a top level view, the Key Generator 300 is partitioned into two logic paths: a Control Path 305 and a Data Path 310. The input token and the template information are joined and flowed through the Key Generator 115 through the Control Path 305 and the Data Path 310. The Control Path 305 is responsible for generating instructions which are then executed by the Data Path 310 for generating the lookup key.

The Key Generator Control Path (KGCP) 305 includes four blocks: a Control Bits Extractor (CBE) 315, a MUX/CMP Cone (MCC) 320, a MUX/LUT Logic Cone (MLLC) 325 and a Key Gen Instruction Tables (KGIT) 330.

The CBE 315 in the KGCP 305 extracts important bits from the input token which typically contains main network features encapsulated in the input token, including specific bits in the Common Portion 205 of FIG. 2A and all control bits 225a of each of the Layers 225 in the Layers Portion 210 of FIG. 2A. Positions of the bits extracted from the Common portion 205 of the token are typically reconfigurable by software. In addition, the CBE 215 also extracts all metadata bits of the template lookup result returned by the Template Table 250.

The MCC 320 in the KGCP 305 includes a plurality of configurable MUX/CMP Cells in parallel. Each MUX/CMP Cell compares two arbitrary words in the token. Positions of these two words are typically configurable by software. Each MUX/CMP Cell can also compare one word with a constant value. In some embodiments, three comparison operations are supported: equal to (==), greater than (>) and less than (<). The bitwidth of each selected word is typically 16 or 32 bits, although different sizes are possible. The number of MUX/CMP Cells in the MCC 320 of the KGCP 305 is typically from 8 to 16, although the number of MUX/CMP Cells in the MCC 320 can be different as long as the number is not less than the maximum number of token layers packed in the Layers portions of the input token.

All output bits of the CBE 315 and the MCC 320 are joined and sent to the MLCC 325. The MLLC 325 in the KGCP 305 typically has a plurality of stages. Each stage includes a plurality of MUX/LUT Cells in parallel. Input bits of the first stage are the joined output bits of the CBE 315 and the MCC 320. The input bits of stage i are all output bits of stage i-1. The output bits of the last stage form the indexes for reading the KGIT 330.

In some embodiments, a MUX/LUT Cell contains six multiplexors which select six arbitrary bits from its input bits. The positions of these six selected bits are typically configurable by software. Each of these six selected bits returns a one bit output to form a pointer to a 64-bit lookup table. The design of each MUX/LUT Cell advantageously allows users to perform any logic expression on the six arbitrary bits from its input bits.

Since the MLLC 325 has a plurality of stages and each stage has a plurality of MUX/LUT Cells in parallel, users can program the MLLC 325 to perform several complex expressions and rules for checking the token to generate an appropriate lookup key that depends on the network features and protocols users want the LDE 100 of FIG. 1 to support. The MLLC 325 typically has three or four stages, although more or less stages are possible. Each stage, except the last stage in the MLLC 325, typically has 32 to 64 MUX/LUT Cells. The number of MUX/LUT Cells in the last stage is equal to the number of bits of all indexes going to the KGIT 330.

The output bits of the MLLC 325 create index pointers for reading the KGIT 330. Depending on the key size, the KGCP 305 can have one or multiple tables in parallel. Each table entry contains multiple instructions. For each input token, the number of instructions returned by the KGIT 330 is equal to the number of tables multiplied by the number of instructions per table entry. Assume the key size is L bytes, and each instruction allows manipulation of a maximum of C bytes. The number of instructions returned by the instruction tables should be at least equal to L/C.

While the joined data of the input token and the template information flows through the Control Path 305, the joined data also flows through the Data Path 310. The Key Generator Data Path (KGDP) 310 includes two blocks: a Delay Matching Queue 335 and a Key Gen Instructions Execution block 340.

The joined data is buffered inside the Delay Matching Queue 335. The Delay Matching Queue 335 can be a FIFO or a shift register. The Delay Matching Queue 335 has the buffer depth that is equal to the latency of the KGCP 305 so that a LDE, such as the LDE 100 of FIG. 1, can operate in full throughput. Once the instructions for each token are produced by the KGCP 305, the corresponding token is removed from the Delay Matching Queue 335 and is sent to the Key Gen Instructions Execution block 340. The Key Gen Instructions Execution block 340 executes the instructions and uses the input token as the source data for building a lookup key. In some embodiments, two kinds of instructions for building this output lookup key are supported: Copy instructions and ALU instructions.

FIG. 4A illustrates a format of a Copy instruction 400 for key generation according to an embodiment of the present invention. The Copy instruction 400 allows for copying of data from a source to a specific position in the output key. A "Src_ID" field 405 points to a source data in which a maximum of C bytes will be copied from. The maximum number of C bytes for each Copy instruction is selected based on design options, including a silicon area budget of a LDE, such as the LDE 100 of FIG. 1. All source data for the KGDP 310 are listed in a table shown in FIG. 4C. The source data for building the lookup key are all token layers, the Common portion of the input token, and the metadata field in the template information associated with the input token.

A "Src_ByteOffset" field 410 indicates a starting byte position in the selected source data. It is from that starting byte position that C bytes are copied. In certain cases, users would like to copy bits instead of bytes or to copy less than C bytes. In these cases, a "BitMask" field 415 is used to mask the copied bytes. Also, in certain cases, users would like to copy a constant value to the lookup key rather than from a source data. In these cases, a "IsConst" field 420 is set and the "BitMask" field 415 is used to contain the constant value. Finally, a "Dst_ByteOffset" field 425 points to a position in the output key where the copied masked bytes or the constant value are pasted to.

FIG. 4B illustrates a format of an ALU instruction 430 for key generation according to an embodiment of the present invention. The meanings of fields 440-475 in the ALU instruction 430 are the same as those in the Copy instruction 400, except each ALU instruction 400 allows copying from source data or copying constant values for two operands of an Arithmetic and Logic Unit (ALU) module. The ALU operation is selected by an "OpCode" field 435 which supports at least the following operations: addition (+), subtraction (−), bitwise AND (&), bitwise OR (|), bitwise XOR (^), bitwise shift left (<<) and bitwise shift right (>>). The ALU result is pasted to the output key at the position identified by a "Dst_ByteOffset" field 480.

The maximum number of copied bytes per each ALU instruction and the bitwidth of ALU operation are selected based on design options. The number of copied bytes is typically 4 bytes to 8 bytes, and the size of the ALU operation is typically 16 bits or 32 bits. However, the number of copied bytes and the size of the ALU operation can be different.

For each input token, all instructions produced by the KGCP 305 are executed in parallel by the KGDP 310 for building the lookup key. The lookup key is initialized by all zeros before all instructions are executed. The lookup key is then modified by all instructions and is thereafter sent to the remote Search Engine. The remote Search Engine is configured to return a lookup result for each lookup key at some time later.

Figure 5:
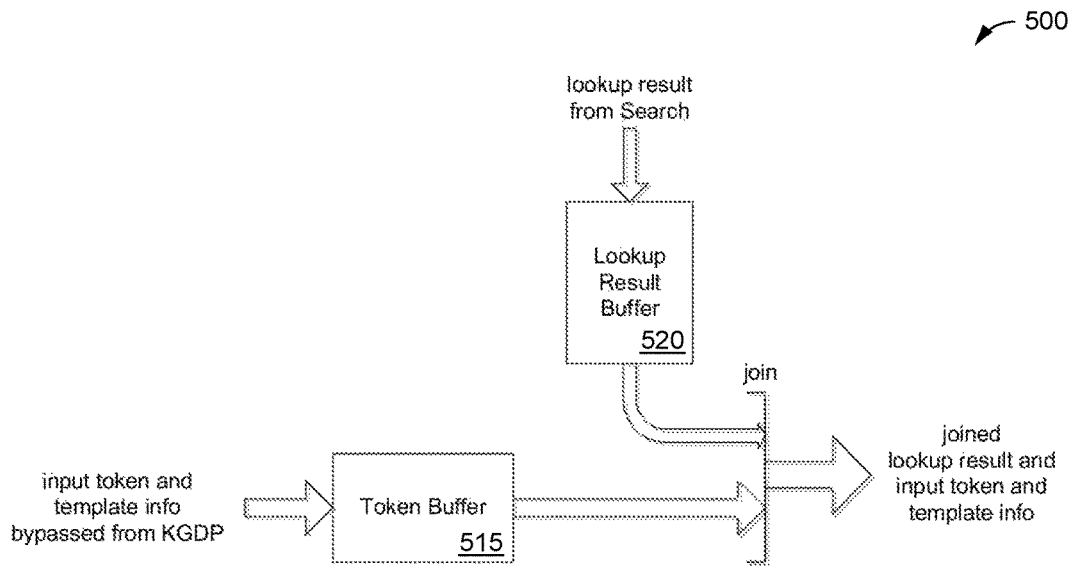
FIG. 5 illustrates a block diagram of a Lookup Result Collector according to an embodiment of the present invention.

While the KGDP 310 executes the instructions, the KGDP 310 also passes the original input token and the corresponding template information to the Lookup Result Collector 120 of FIG. 1. FIG. 5 illustrates a block diagram of a Lookup Result Collector 500 according to an embodiment of the present invention. In some embodiments, the Lookup Result Collector 120 of FIG. 1 is similarly configured as the Lookup Result Collector 500. While waiting for the lookup result to be returned by the remote Search Engine, all input data including the input token and the corresponding template information are buffered inside a Token Buffer 515. The depth of the Token Buffer 515 is at least equal to the latency of the remote Search Engine so that a LDE, such as the LDE 100 of FIG. 1, can operate in full throughput.

The lookup result returned by the remote Search Engine for the corresponding lookup key is buffered inside a Lookup Result Buffer 520. The Lookup Result Collector 500 checks the Lookup Result Buffer 520 to determine whether a lookup result is available for an input token inside the Token Buffer 515. The Lookup Result Collector 500 takes the input token along with its template information and the corresponding lookup result out of the buffers 515-520, joins the data and sends the joined data to the Output Generator 125 of FIG. 1.

Figure 6:
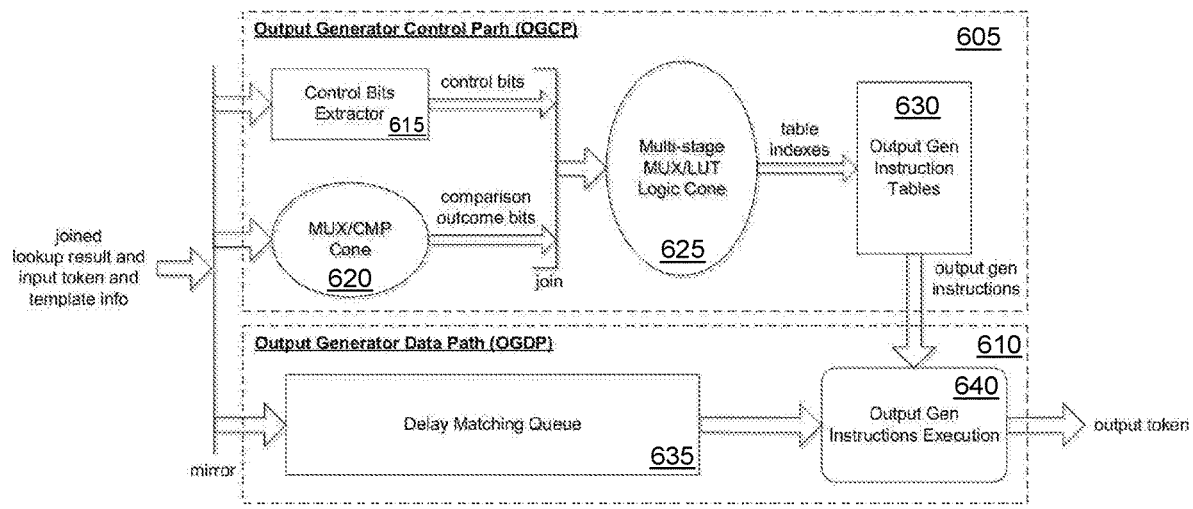
FIG. 6 illustrates a block diagram of an Output Generator according to an embodiment of the present invention.

FIG. 6 illustrates a block diagram of an Output Generator 600 according to an embodiment of the present invention. In some embodiments, the Output Generator 125 of FIG. 1 is similarly configured as the Output Generator 600. Designs of the Output Generator 600 and the Key Generator 300 are similar. Similarity in both Key Generator and Output Generator designs advantageously allows for the reuse of a large amount of the designs, which effectively reduces the development and verification costs for the LDE.

At a top level view, the Output Generator 600 is also partitioned into two logic paths: a Control Path 605 and a Data Path 610. Some differences between the Output Generator 600 and the Key Generator 300 include input data and output data. The input data of the Output Generator 600 is the original input token, its corresponding template information and the corresponding lookup result. The output data is a token that is modified based on the contents of the lookup result and the original input token itself.

The Output Generator Control Path (OGCP) 605 includes four blocks: a Control Bits Extractor (CBE) 615, a MUX/CMP Cone (MCC) 620, a MUX/LUT Logic Cone (MLLC) 625 and an Output Gen Instruction Tables (OGIT) 630.

Since the input of the Output Generator 600 has more input data than those of the Key Generator 300 of FIG. 3, blocks in the Output Generator 600 are bigger than the corresponding blocks in the Key Generator 300. Particularly, in addition to extraction of input token control bits and template metadata bits, the CBE 615 in the OGCP 605 also extracts control bits inside the lookup result. As such, the lookup result preferably has a format that is understood by both the remote Search Engine and a LDE, such as the LDE 100 of FIG. 1.

The MCC 620 in the OGCP 605 typically has more MUX/CMP Cells than the MCC 320 in the KGCP 305 of FIG. 3. The number of MUX/CMP Cells in the MCC 620 of the OGCP 605 is typically from 16 to 32, although the number of MUX/CMP Cells in the MCC 620 can be different as long as the number is not less than the number of token layers plus one (for supporting additional comparisons of data words from the lookup result).

The MLLC 625 in the OGCP 605 typically has more stages than the MLLC 325 in the KGCP 305 of FIG. 3 to support more complex checking conditions and rules because of the additional control bits from the lookup result. The number of stages in the MLLC 625 in the OGCP 605 is typically five or six stages, although more or less stages are possible.

The OGCP 605 typically has more instruction tables than the KGCP 305 of FIG. 3. The number of instructions returned by the OGCP 605 must be enough to manipulate all fields in the output token. Assume the token size is Mbytes, and each instruction allows manipulation of a maximum of C bytes. The number of instructions returned by the instruction tables should be at least equal to M/C.

In some embodiments, two kinds of instructions for generating the output token are supported: Copy instructions and ALU instructions. FIG. 7A and FIG. 7B illustrate formats of a Copy instruction 700 and an ALU instruction 740, respectively, for output generation according to an embodiment of the present invention. The formats of the Copy instruction 700 and the ALU instruction 740 for output generation are similar to the formats of the Copy instruction 400 (FIG. 4A) and the ALU instruction 430 (FIG. 4B) for key generation, except that the Copy instruction 700 and the ALU instruction 740 have more source data and destinations.

A "Src_ID" field 705, a "Src_ByteOffset" field 710, a "BitMask" field 715, a "IsConst" field 720, and a "Dst_ByteOffset" field 730 of the Copy instruction 700 are similarly configured as the "Src_ID" field 405, a "Src_ByteOffset" field 410, a "BitMask" field 415, a "IsConst" field 420, and a "Dst_ByteOffset" field 425, respectively, of the Copy instruction 400.

An "OpCode" field 745, a "SrcA_ID" field 750, a "SrcA_ByteOffset" field 755, a "SrcA_BitMask" field 760, a "SrcA_IsConst" field 765, a "SrcB_ID" field 770, a "SrcB_ByteOffset" field 775, a "SrcB_BitMask" field 780, a "SrcB_IsConst" field 785, and a "Dst_ByteOffset" field 795 of the ALU instruction 740 are similarly configured as the "OpCode" field 435, the "SrcA_ID" field 440, the "SrcA_ByteOffset" field 445, the "SrcA_BitMask" field 450, the "SrcA_IsConst" field 455, the "SrcB_ID" field 460, the "SrcB_ByteOffset" field 465, the "SrcB_BitMask" field 470, the "SrcB_IsConst" field 475, and the "Dst_ByteOffset" field 480, respectively, of the ALU instruction 430.

All source data for instructions of the Output Generator Data Path (OGDP) 610 are listed in a table shown in FIG. 7C. The source data for generating the output token are all layers of the input token, the Common portion of the input token, the metadata field in the template information associated with the input token, and the lookup result of the input token.

All destination identifications for instructions of the OGDP 610 are listed in a table shown in FIG. 7D. A "Dst_ID" field 725, 790 in the instructions indicates a selection of which destination among the layers or the Common portion in the output token in which the copied data from a source will be pasted to. The position in the selected destination for pasting data is given by the "Dst_ByteOffset" field 730, 795 which is similar to those in the key generation instructions.

All instructions produced by the OGCP 605 are executed in parallel by the OGDP 610 for generating the new output token. The output token is initialized to have the same content as the input token before all instructions are executed. After all instructions are executed, the output token is a modified version of the input token.

The LDE 100 of FIG. 1 is highly flexible, fully programmable, and protocol independent, which advantageously allows users to perform a variety of network features and protocols through appropriately configuring the control paths of the Key Generator 115 and the Output Generator 125. For example, the LDE 100 can be configured to generate a lookup key for doing an IP lookup as a router, or an Ethernet L2 lookup or a VLAN lookup as a switch, or a network attacking detection lookup as a firewall, or an address to name lookup as a network address translator. Based on the lookup result, the token is appropriately modified.

The modified token is then checked by the Loopback Checker 130 to see whether the modified token is to be sent back to the current LDE for doing another lookup or is to be sent to other engines in the SDN system. Supporting the loopback path 140 advantageously allows doing multiple lookups at the same engine. The Loopback Checker 130 compares a "Dst_EngineAddress" field inside the Common portion of the modified token with the address of the current engine. If they are the same, then the modified token is sent back to the current engine via the loopback path 140 as shown in FIG. 1. In FIG. 1, the loopback path 140 has higher priority than an input path (e.g., from the Input FIFO 105) to avoid deadlock.

The final output token is sent to another engine for doing more lookups if needed, or is sent to an Update Read Write (URW) block. Based on the modified content in the token, the URW block will modify the corresponding network packet headers (which the original token was parsed from) accordingly. These modified network packet headers, will then be combined with its corresponding payload by a Transmitting Queue block to form the final modified output network packet which reflects the network features and protocols configured for the LDE. The modified network packet is then sent to other components in the SDN system for further processing or is forwarded to another device in the network.

Figure 8:
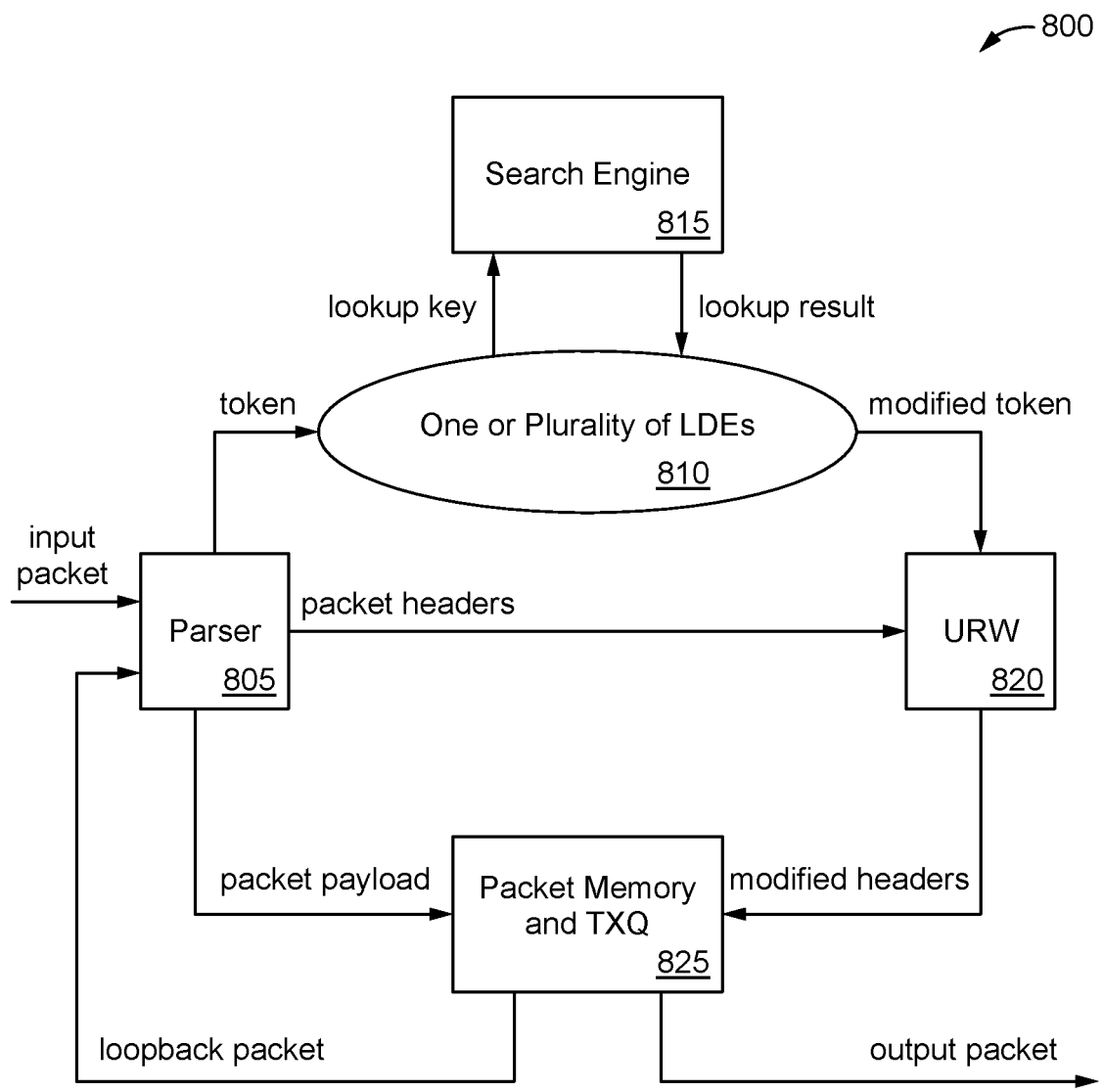
FIG. 8 illustrates a block diagram of a software-defined network (SDN) system in accordance with an embodiment of the present invention.

FIG. 8 illustrates a block diagram of a software-defined network (SDN) system 800 in accordance with an embodiment of the present invention. The system 800 includes a Parser 805, at least one LDE 810, a Search Engine 815, an Update Read Write (URW) block 820, a Packet Memory and Transmitting Queue (TxQ) block 825. A network packet is received at the Parser 805. The Parser 805 parses headers of the network packet and puts control bits and the parsed headers in a token. The Parser 805 sends the token to the one or plurality of LDEs 810 and the original packet headers of the network packet to the URW 820 as well as the original packet payload to Packet Memory and TxQ 825.

The token is typically in a format that is understood by the LDEs 810. One of the LDEs 810 receives the token from the Parser 805. As discussed above, each LDE 810 generates a lookup key, and sends this lookup key to the remote Search Engine 815 which returns a lookup result some time later. After receiving the lookup result from the Search Engine 815, the LDE 810 modifies the token based on the contents of the lookup result and the token. Based on the "Dst_EngineAddress" field of the modified token, the modified token can be sent to another LDE in the plurality of LDEs 810 or to the same LDE for performing more lookups if needed. After all necessary lookups and token modifications by LDEs 810 are completed, a final output token is sent to the URW block 820. The URW block 820 modifies the corresponding packet headers based on the content of the modified token; hence the modified packet headers appropriately reflect the network features configured for the LDEs 810. The modified packet headers are then sent to the Packet Memory and TxQ block 825. The Packet Memory and TxQ block 825 combines the original packet payload and the modified packet headers to form the final output network packet. The final output packet network is then sent to other components in the SDN system for further processing, or is forwarded to another device in the network, or can be sent back (loopback) to the Parser to be able to do more lookups if desired.

Embodiments of the present invention relate to a Lookup and Decision Engine (LDE) for generating lookup keys for input tokens and modifying the input tokens based on contents of lookup results. The input tokens are parsed from network packet headers by a Parser, and the tokens are then modified by the LDE. The tokens modified by the LDE guide how the corresponding network packets will be modified or forwarded by other components in a software-defined networking (SDN) system. The design of the LDE is highly flexible and protocol independent. Conditions and rules for generating lookup keys and for modifying tokens are fully programmable such that the LDE can perform a wide variety of reconfigurable network features and protocols in the SDN system.

One of ordinary skill in the art will realize other uses and advantages also exist. While the invention has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details, but rather is to be defined by the appended claims.

We claim:

1. A software-defined network (SDN) system comprising:
    a Parser configured to receive incoming network packets, parse headers of the incoming network packets and to output tokens;
    a Template Table for identifying positions of fields in each of the tokens; and
    at least one Lookup and Decision Engine (LDE) configured to generate a lookup key for each token and to modify the token based on one or more lookup results.

2. The software-defined network (SDN) system of claim 1, wherein the at least one Lookup and Decision Engine includes a plurality of Lookup and Decision Engines coupled in serial for performing multiple lookups sequentially or in parallel for performing multiple lookups simultaneously.

3. The software-defined network (SDN) system of claim 1, wherein the at least one Lookup and Decision Engine includes:
    a Key Generator configured to generate the lookup key for the token; and
    an Output Generator configured to output the modified token based on content of one of the lookup results that is associated with the lookup key.

4. A software-defined network (SDN) system comprising:
- a Parser configured to receive incoming network packets, parse headers of the incoming network packets and to output tokens; and
- at least one Lookup and Decision Engine (LDE) configured to generate a lookup key for each token of the tokens and to modify the token based on one or more lookup results, wherein the at least one LDE comprises:
- an Input Buffer for temporarily storing each token of the tokens before the token is processed by the LDE;
- a Lookup Result Collector for joining each token of the tokens with the one or more lookup results corresponding to that token, and for sending the joined input token with the one or more lookup results to an Output Generator; and
- a Loopback Checker for determining whether each of the tokens output by the Output Generator are loopback tokens that should be sent back to the LDE or non-loopback tokens that should not be sent back to the LDE.

5. The software-defined network (SDN) system of claim 4, wherein the LDE comprises a Loopback Buffer for storing the loopback tokens, wherein the loopback tokens have higher priority for selection for processing by the LDE than those in the Input Buffer.

6. The software-defined network (SDN) system of claim 4, wherein the Input Buffer and the Loopback Buffer are FIFO buffers.

* * * * *